United States Patent
Choi

(10) Patent No.: US 6,449,257 B1
(45) Date of Patent: Sep. 10, 2002

(54) SYSTEM AND METHOD OF MANAGING NETWORK STATE IN MOBILE RADIO COMMUNICATION SYSTEM

(75) Inventor: Woo Young Choi, Kyungki-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/196,783

(22) Filed: Nov. 20, 1998

(30) Foreign Application Priority Data

Dec. 31, 1997 (KR) ............................................ 97/82218

(51) Int. Cl.⁷ .......................... H04L 12/26; H04B 7/212
(52) U.S. Cl. ...................................... 370/242; 370/442
(58) Field of Search ............................... 370/217, 241, 370/248, 252, 328, 329, 332, 349, 338, 406, 467, 242, 442; 455/516, 524, 520, 406, 507, 509, 517

(56) References Cited

U.S. PATENT DOCUMENTS 5,509,029 A  *  4/1996  Furuta ........................ 375/228
5,544,154 A  *  8/1996  Glitho ......................... 370/17
5,793,765 A  *  8/1998  Boer et al. ................... 370/395
5,799,076 A  *  8/1998  Sitters et al. ................ 379/229
5,802,105 A  *  9/1998  Tiedemann ................... 375/225
6,091,738 A  *  7/2000  Tsujikado et al. ............ 370/453

* cited by examiner

*Primary Examiner*—Alpus H. Hsu
*Assistant Examiner*—Duc Ho
(74) *Attorney, Agent, or Firm*—Fleshner & Kim, LLP

(57) ABSTRACT

A network state management system and method in a mobile radio communication system capable of preventing the inconsistency of the state information between a plurality of networks, routing defect, abnormal load share function, etc. According to the network state management method, a test packet is transmitted to a remote network through normal trunk links at predetermined intervals, and the trunk, which is identified as an abnormal trunk utilizing information included in the transmitted test packet, is compulsorily transmitted to an abnormal state. Thereafter, it is identified again whether the trunk link once transmitted and classified into the abnormal trunk link is in the normal or abnormal state through a separate test process, and if the trunk link is identified to be abnormal, it is managed as the normal trunk link. The network management state is renewed whenever the test packet for the trunks is transmitted.

24 Claims, 3 Drawing Sheets

SYSTEM AND METHOD OF MANAGING NETWORK STATE IN MOBILE RADIO COMMUNICATION SYSTEM

BACKGROUND OF THE INVENTION

1. Field of the Invention

The present invention relates to a system and method of managing a network state in a mobile radio communication system. In particular, the present invention relates to a network state management system and a network state management method utilizing the system which can compatibly manage the state of a network in which base station controllers and base station transceiver subsystems are linked through a plurality of trunks in a code division multiple access (CDMA) communication system and a personal communication service (PCS) system.

2. Description of the Related Art

Generally, if a certain mobile unit subscriber selects a terminating telephone number and transmits a call signal thereto in a mobile radio communication system, the corresponding base station receives a radio frequency signal transmitted from the originating mobile unit, and calls the terminating mobile unit through a calling channel. At this time, if the terminating mobile unit responds, a speech channel is provided between the two mobile units to achieve call communications. Here, respective base stations repeat the radio communications attempted by a plurality of mobile units located in a predetermined service area. A plurality of base station controllers are provided in a mobile radio communication system, and each base station controller controls a plurality of base stations.

However, in case of performing the call communications utilizing the currently defined communication protocol, a mobile unit may fail to receive a communication control signal transmitted from a base station in a special condition, or the base station may fail to receive the communication control signal transmitted from the mobile unit to the base station in a special condition, resulting in that the call communications between the terminating and originating mobile units may not be performed.

In order to manage such system troubles, a mobile radio communication system is provide with a network state management device. A typical network state management device detects the state of the network in which respective base station controllers or base stations under the control of a base station manager are linked other base stations or base station controllers through a plurality of trunks, outputs the resultant signal to a display device, and outputs an audio alarm to a loudspeaker.

FIG. 1 illustrates a network state management device for managing the trunk link state of the network between a typical base station controller and base station used in a mobile radio communication system.

Referring to FIG. 1, a certain base station controller 104 in a mobile radio communication system is connected to a base station 100 through two trunk transmission devices 101 and 102, and a plurality of trunk lines are connected between the two trunk transmission devices 101 and 102. Here, the base station controller 104 is provided with a state management processing section 104a, and detects whether the link state of the trunks T1 and T2 of the corresponding network is in a normal state or in an abnormal state utilizing information sensed by the trunk transmission device 102 by hardware. Specifically, as shown in FIG. 1, the trunk transmission device 102 provides the trunk state information 105a, which is obtained by sensing the link state of the trunks T1 and T2 by hardware, to the state management processing section 104a in the base station controller 104 through a separate control line.

Meanwhile, the base station 100 is also provided with a state management processing section 100a, and detects whether the link state of the trunks T1 and T2 of the corresponding network is in a normal state or in an abnormal state utilizing information sensed by the trunk transmission device 101 by hardware. Specifically, as shown in FIG. 1, the trunk transmission device 101 provides the trunk state information 105b, which is obtained by sensing the link state of the trunks T1 and T2 by hardware, to the state management processing section 100a in the base station 100 through a separate control line.

Accordingly, whether a normal routing of the call from the region between the base station controller 104 and the base station 100 to the remote network is possible or not is determined in accordance with the link state information of the corresponding links T1 and T2 sensed by hardware by the state management processing section 100a of the base station 100 and the state management processing section 104a of the base station controller 104 as shown in FIG. 1.

Also, even in case that a normal routing of the call is performed from the region between the base station controller 104 and the base station 100 to the remote network, the load share with respect to the links T1 and T2 should be done. At this time, the normally operable links are identified in accordance with the link state information of the corresponding links T1 and T2 sensed by hardware by the state management processing section 100a of the base station 100 and the state management processing section 104a of the base station controller 104, and then the normal load share is performed based on the identified result.

However, the conventional network state management device as described above only depends on the state information of the same trunk links T1 and T2 connected to the base station controller 104 and the base station 100 which is separately sensed through the respective trunk transmission devices 101 and 102 connected to the base station controller 104 and the base station 100. Accordingly, the base station controller 104 or the base station 100 determines whether to perform the routing only using the state information of the trunk links T1 and T2 provided thereto by hardware. As a result, if the state information of the trunk links T1 and T2 currently provided to the base station controller 104 is not consistent with that provided to the base station 100, serious problems may occur in routing or load share.

For example, we assume that two trunk links T1 and T2 exist between the base station controller 104 and the base station 100 via the trunk transmission devices 101 and 102 as shown in FIG. 1, the base station controller 104 identifies T1 and T2 as normal trunks based on the information provided by hardware, and the base station 100 identifies T2 only as a normal trunk based on the information provided by hardware. In this case, the base station controller 104 and the base station 100 cannot mutually perform normal data transmission and reception utilizing the trunks T1 and T2. In other words, the base station controller 104 identifies both T1 and T2 as the normal trunks and thus attempts to perform the load share with respect to the trunks T1 and T2, but the base station 100 attempts to perform the load share with respect to the trunk T1 only, resulting in that the normal data transmission and reception cannot be achieved through the two trunks.

As a result, in case of managing the link state of the trunks T1 and T2 using the conventional network state management device in a mobile radio communication system, connection of the call for calling the terminating mobile unit may fail, or the call communications between the originating and terminating mobile units in use may be cut off, thereby deteriorating the speech quality of the whole mobile radio communication system.

SUMMARY OF THE INVENTION

Accordingly, the present invention is directed to a system and method of managing the network state in a mobile radio communication system that substantially obviates one or more of the problems due to limitations and disadvantages of the related art.

An object of the present invention is to provide a system and method of managing the network state in a mobile radio communication system whereby two processors can mutually exchange the state information of bidirectional trunk links by an on-line processing for the compatible management of the network state.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the network state management system in a mobile radio communication system comprises a first processor, a first trunk transmission device connected to the first processor, a second processor, a second trunk transmission device connected to the second processor, and a plurality of trunks connected between the first and second trunk transmission devices, wherein the first and second trunk transmission devices sense and reconstruct link state information of the trunks so that the first and second processors can recognize the reconstructed link state information, and the first and second processors mutually exchange the reconstructed link state information.

In another aspect of the present invention, there is provided a method of managing the network state in a mobile radio communication system, comprising the steps of providing a test packet at predetermined intervals and transmitting the test packet mutually between at least two processors, and identifying a link state of trunks for connecting the processors utilizing the test packet.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
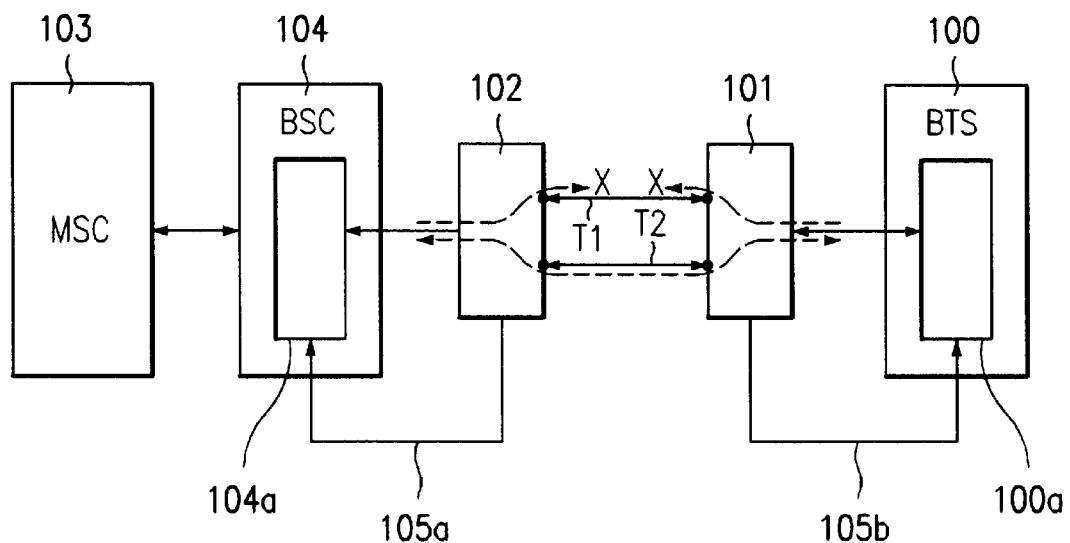
FIG. 1 is a block diagram schematically illustrating the construction of a conventional network state management device.
Figure 2:
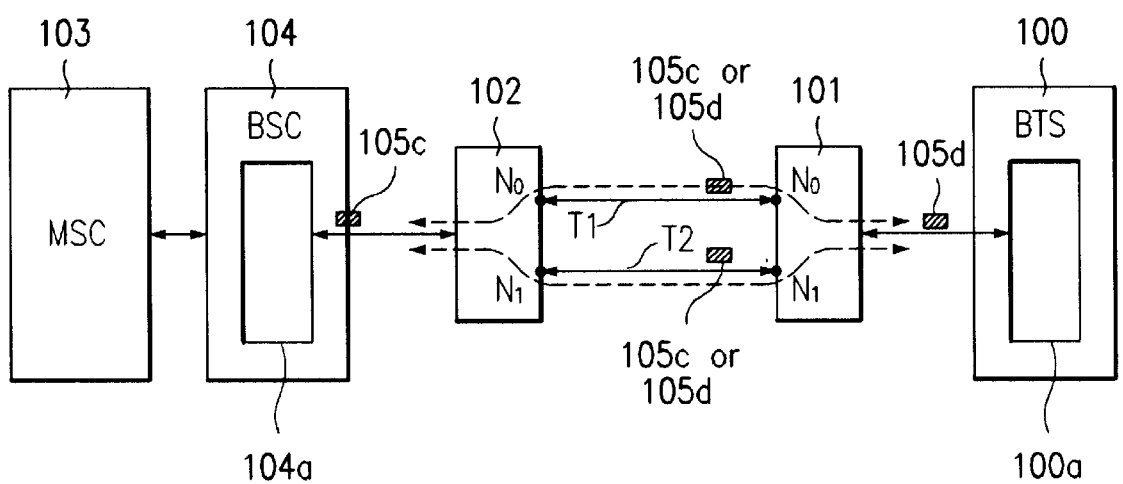
FIG. 2 is a block diagram schematically illustrating the construction of the network state management system according to an embodiment of the present invention.

FIG. 2 is a block diagram schematically illustrating the construction of the network state management system according to an embodiment of the present invention. Referring to FIG. 2, the network state management system according to the present invention includes a base station controller 104, a trunk transmission device 102 connected to the base station controller 104, a base station 100, a trunk transmission device 101 connected to the base station 100, and a plurality of trunks T1 and T2 connected between the two trunk transmission devices 101 and 102. The respective trunk transmission devices 101 and 102 sense the link state of the trunks T1 and T2, and mutually exchange the link state information of the respective trunks T1 and T2 at predetermined intervals.

Also, state management processing sections 104a and 100a provided in the base station controller 104 and the base station 100, respectively, perform the state transition in real time with respect to the link state information of the trunks T1 and T2, and identify whether the link state of the corresponding trunks is in a normal state or in an abnormal state to perform a necessary process.

Specifically, according to the network state management system according to one embodiment, the trunk transmission device 102 of the base station controller 104 reconstructs by software the link state information of the trunks T1 and T2, which is sensed by hardware, to produce a test packet 105c, and periodically transmits this test packet 105c to the base station controller 104 or to the trunk transmission device 101 of the base station 100. On the other hand, the trunk transmission device 101 of the base station 100 reconstructs by software the link state information of the trunks T1 and T2, which is sensed by hardware, to produce a test packet 105d, and periodically transmits this test packet 105d to the base station 100 or to the trunk transmission device 102 of the base station controller 104.

At this time, the test packets reconstructed by software include the link state information of the respective trunks T1 and T2, and are transmitted through the same nodes of the respective trunks T1 and T2. Specifically, as shown in FIG. 2, the test packets are transmitted to the state management processing sections 104a and 100a of the base station 100 and the base station controller 104 through nodes $N_C$-$N_0$ and $N_1$-$N_1$, of the trunk transmission devices 101 and 102, respectively, and thus the inconsistency of the link state of the trunks T1 and T2 between the base station 100 and the base station controller 104 can be prevented.

Figure 5:
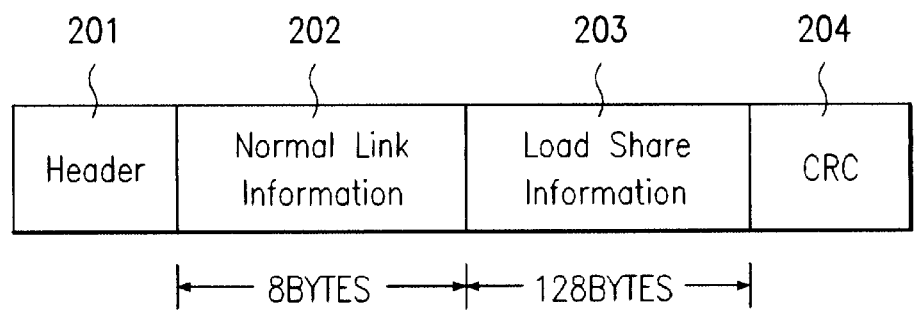
FIG. 5 is a view illustrating the structure of a test packet used in testing the network state according to the network state management method of the present invention.

If the inconsistency of the link state occurs in the regions of the respective trunks T1 and T2, the state of the trunk link T1 or T2 which is identified to be abnormal by either of the networks is transmitted to the abnormal state by software for the effective management of the networks, so that the routing is not performed any more through the abnormal trunk. Also, in case that any temporary defect of the trunk link T1 or T2 due to noise occurs, the corresponding link state is transmitted to the abnormal state so that no more routing is performed. The trunk link T1 or T2, whose state is transmitted to the abnormal state, is then tested through a separate on-line testing process. If the trunk passes the test, its state is transmitted to the normal state again. As shown in FIG. 5, the test packet includes a header 201, normal link information 202, load share information 203, and cyclic redundancy check (CRC) information 204.

The header 201 includes the destination address, source address, and packet control file of the corresponding packet.

The normal link information 202 is the information on the normal link currently used, and is composed of 8 bytes. Here, each byte represents the maximum acceptable number of nodes of the trunks T1 and T2 in a single trunk link matching device, and each bit represents the normal/abnormal state of the corresponding node. For instance, if the bit value is "0", the node is in a normal state, while if the bit value is "1", the node is in an abnormal state.

The load share information 203 is the information representing the present state where the load of the trunks is shared to the respective base station 100 or to the base station controller 104. Specifically, it represents the number of trunks which are connected to the same base station 100 or to the same base station controller 104 between the normal trunks T1 and T2 based on the normal link information 202. This load share information 203 is composed of 128 bytes (i.e., 2 bytes for each base station or base station controller) so that it can represent the information about 64 base stations or base station controllers. For instance, the first one byte allocated to each base station controller is for representing the state of the normal trunk connected to the corresponding base station controller.

The cyclic redundancy check (CRC) information is the field information for securing no defect of the packet.

Figure 3:
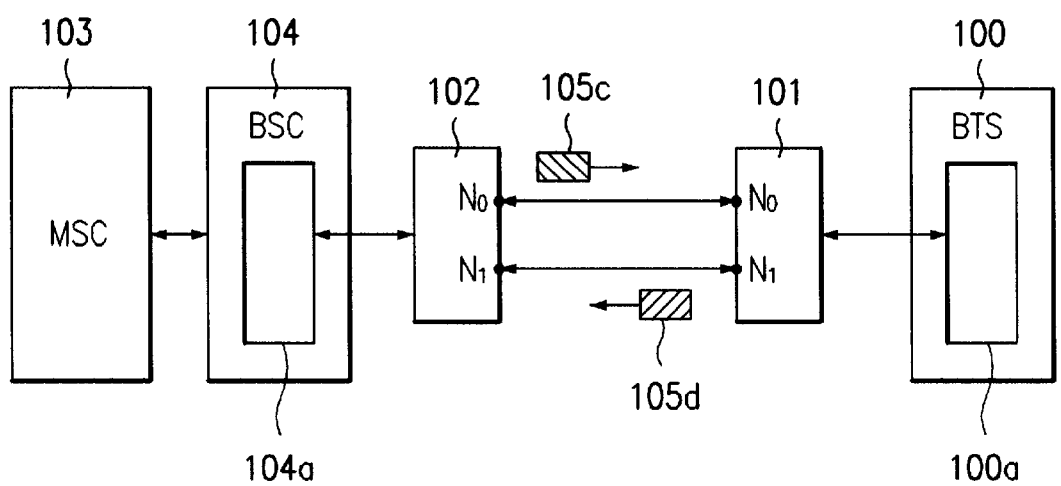
FIG. 3 is a block diagram schematically illustrating the construction of the network state management system according to another embodiment of the present invention.

FIG. 3 is a block diagram schematically illustrating the construction of the network state management system according to another embodiment of the present invention. Referring to FIG. 3, the network state management system according to another embodiment includes a base station controller 104, a trunk transmission device 102 connected to the base station controller 104, a base station 100, a trunk transmission device 101 connected to the base station 100, and a plurality of trunks T1 and T2 connected between the two trunk transmission devices 101 and 102. The respective trunk transmission devices 101 and 102 sense the link state of the trunks T1 and T2, and mutually exchange the link state information of the respective trunks T1 and T2.

However, according to the network state management system according to another embodiment, the trunk transmission device 102 of the base station controller 104 reconstructs by software the link state information of the trunks T1 and T2, which is sensed by hardware, to produce a test packet 105c, and periodically transmits this test packet 105c only to the trunk transmission device 101 of the base station 100. On the other hand, the trunk transmission device 101 of the base station 100 reconstructs by software the link state information of the trunks T1 and T2, which is sensed by hardware, to produce a test packet 105d, and periodically transmits this test packet 105d only to the trunk transmission device 102 of the base station controller 104.

Accordingly, as in the embodiment of FIG. 2, the inconsistency of the link state of the trunks T1 and T2 between the base station 100 and the base station controller 104 can be prevented.

Figure 4:
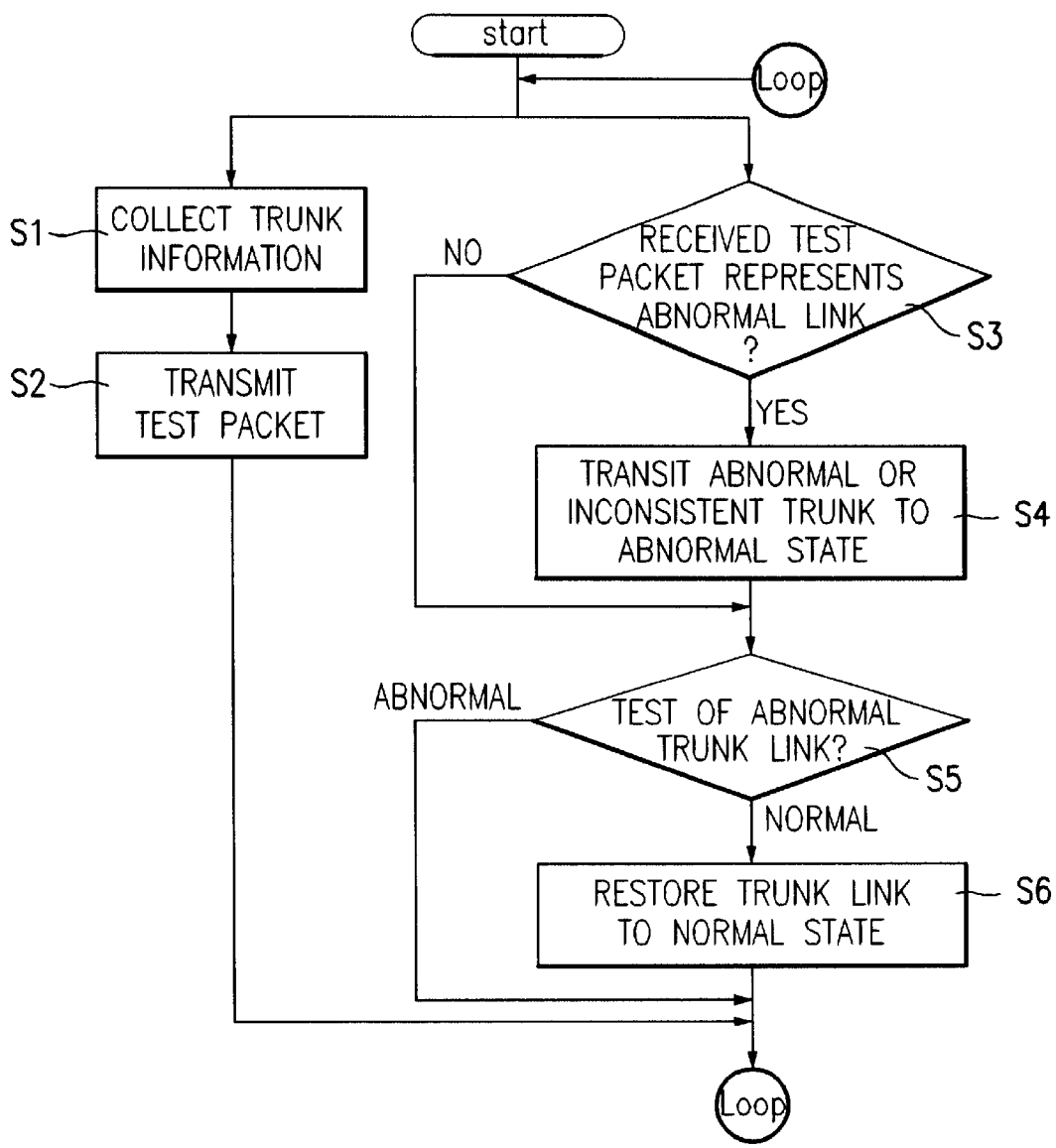
FIG. 4 is an algorithm diagram illustrating the network state management method according to the present invention.

FIG. 4 is an algorithm diagram illustrating the network state management method according to the present invention. Referring to FIG. 4, according to the network state management method utilizing the network state management system which includes a base station controller 104, a trunk transmission device 102 connected to the base station controller 104, a base station 100, a trunk transmission device 101 connected to the base station 100, and a plurality of trunks T1 and T2 connected between the two trunk transmission devices 101 and 102, the base station controller 104 or the base station 100 collects the link state information of the trunks T1 and T2 sensed by hardware, reconstructs by software the link state information to produce a test packet, and then periodically transmits this test packet to the remote network (step S1).

Thereafter, the test packet provided from the trunk transmission device 102 of the base station controller 104 is periodically transmitted to the trunk transmission device 101 of the base station 100 or to the base station controller 104 (step S2). Also, the test packet provided from the trunk transmission device 101 of the base station 100 is periodically transmitted to the trunk transmission device 102 of the base station controller 104 or to the base station 100.

Thereafter, the abnormal trunk links T1 and T2 produced due to various causes such as a fault in hardware, line defect, etc., are identified utilizing the link state information of the trunks T1 and T2 included in the test packet (step S3). If it is identified that any abnormal trunk exists, it is compulsorily transmitted to the abnormal state (step S4). At this time, the link region of the abnormal link T1 or T2 is managed as the abnormal one so that the routing is not performed any more, while the temporary defect of the trunk T1 or T2 due to noise and so on is also managed as the abnormal one so that the routing is not performed any more. Thereafter, it is identified again whether the trunk link, which was once transmitted and classified into the abnormal one, is in the normal or abnormal state through a separate test process (step S5). If the trunk link is identified to be normal by the test process, it is restored to the normal state (step S6).

Since the network state management as described above is renewed whenever the test packet for the trunk link is transmitted, and is processed in real time, the occurrence of the call cutoff and the routing defect can be suppressed at a minimum.

As a result, according to the present invention, the test packet, which is obtained by reconstructing by software the link state information of the trunks sensed by hardware, is mutually transmitted through the bidirectional trunk links, and thus the inconsistency of the trunk link state between the respective base stations and base station controllers can be prevented.

Accordingly, in case of managing the trunk link state between the base station and the base station controller utilizing the network state management device in a mobile radio communication system according to the present invention, the connection failure of the call for calling the terminating mobile unit or the cutoff of call communications between the originating and terminating mobile units in use can be prevented, thereby greatly improving the speech quality of the whole mobile radio communication system. While the present invention has been described and illustrated with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A network state management system in a mobile radio communication system, comprising:

a first processor;

a first trunk transmission device connected to the first processor;

a second processor;

a second trunk transmission device connected to the second processor; and a plurality of trunks connected between the first and second trunk transmission devices, wherein the first and second trunk transmission devices sense and reconstruct link state information of the trunks so that the first and second processors can recognize the reconstructed link state information, and the first and second processors mutually exchange the reconstructed link state information, the link state information indicates a normal status or an abnormal status of the respective trunks, each of the first and second processors evaluate the link state information generated separately by the first and second trunk transmission devices and corresponding to a specific one of the plurality of trunks, and both the first and second processors transition the specific trunk to an idle state, when the link state information generated by either one of the first and second trunk transmission devices and corresponding to the specific trunk indicates an abnormal status.

2. The network state management system as claimed in claim 1, wherein the first and second processors are a base station controller and a base station, respectively.

3. The network state management system as claimed in claim 1, wherein the link state information of the trunks is renewed at predetermined intervals.

4. The network state management system as claimed in claim 1, wherein the first and second processors comprise a state management section for transitting the link state information of the trunks in real time.

5. The network state management system as claimed in claim 1, wherein the link state information is transmitted as a test packet including a state management information on the respective trunks.

6. The network state management system as claimed in claim 5, wherein the test packet is produced by reconstructing by software the link state information of the trunks sensed by hardware.

7. The network state management system as claimed in claim 5, wherein the test packet is transmitted to the trunks through same nodes of the trunk transmission devices.

8. The network state management system as claimed in claim 5, wherein the test packet includes a header, normal link information representing information on the normal trunks currently used, and load share information representing a present state where a load of the trunks is shared to the respective base station and base station controller.

9. The network state management system as claimed in claim 8, wherein the header includes a destination address, a source address, and a packet control file of the corresponding packet.

10. The network state management system as claimed in claim 9, wherein the load share information comprises information about at least 64 base stations or base station controllers.

11. The system of claim 1, wherein the first and second processors each separately test the specific trunk to determine its operational status, after the specific trunk is idled.

12. The system of claim 11, wherein the first and second processors transition the specific trunk to an operationally available status, if both the first and second processors determine through their respective tests that the specific trunk is operational.

13. A network state management method in a mobile radio communication system, comprising:

providing a test packet at predetermined intervals and transmitting the test packet mutually between at least two processors;

identifying a link state of trunks for connecting the processors utilizing the test packet, so at least two processors can recognize the identified link state, and at least two processors mutually exchange the identified link state, wherein the link state indicates a normal status or an abnormal status of the respective trunks;

analyzing, with each of the at least two processors, the link state generated at separate points of a specific one of the trunks, and transitioning, with each of the at least two processors, the specific trunk to an idle state when the link state generated at any point of the specific trunk indicates an abnormal status.

14. The network state management method as claimed in claim 13, wherein the link state information of the trunks transmitted from the first and second processors is transmitted in real time.

15. The network state management method as claimed in claim 13, wherein the test packet includes link state management information on the respective trunks.

16. The network state management method as claimed in claim 13, wherein the test packet is produced by reconstructing by software the link state information of the trunks sensed by hardware.

17. The network state management method as claimed in claim 13, wherein the test packet produced by a first trunk transmission device of the first processor is transmitted to the first processor and/or a second transmission device of the second processor, and the test packet produced by the second trunk transmission device of the second processor is transmitted to the second processor and/or the first transmission device of the first processor.

18. The network state management method as claimed in claim 13, wherein the trunk identified as an abnormal trunk at the link state identifying step is transmitted to an abnormal state.

19. The network state management method as claimed in claim 18, wherein it is identified whether the trunk once transmitted and classified into the abnormal trunk is in a normal or abnormal state through a separate test process.

20. The network state management method as claimed in claim 13, wherein the network management state obtained by the test packet providing step and the link state identifying step is renewed whenever the test packet for the trunks is transmitted.

21. The method of claim 3, further comprising testing the specific trunk, with each of the at least two processors, to determine its operational status, after the specific trunk is idled.

22. The method of claim 21, further comprising restoring the specific trunk to an operationally available status, with each of the at least two processors, if the at least two processors determine through their respective tests that the specific trunk is operational.

23. The method of claim 22, further comprising repeatedly testing the specific trunk, with each of the at least two processors, until the specific trunk is restored to the operationally available status.

24. The method of claim 13, further comprising:

comparing, with each of the at least two processors, the link states generated at the separate points of the specific trunk to identify an inconsistency between the separately generated link states; and transitioning, with each of the at least two processors, the specific trunk to an idle state when the separately generated link states are inconsistent.

* * * * *